(12) United States Patent
Forte et al.

(10) Patent No.: US 8,712,688 B2
(45) Date of Patent: Apr. 29, 2014

(54) METHOD FOR PROVIDING INTERACTIVE SITE MAP

(75) Inventors: Michael J. Forte, Poughkeepsie, NY (US); Zamir G. Gonzalez, Poughkeepsie, NY (US); Jenny S. Li, Poughkeepsie, NY (US); Thomas E. Murphy, Jr., Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 520 days.

(21) Appl. No.: 12/634,897

(22) Filed: Dec. 10, 2009

(65) Prior Publication Data
US 2011/0144902 A1 Jun. 16, 2011

(51) Int. Cl.
*G06F 17/00* (2006.01)
(52) U.S. Cl.
USPC .................... 701/516; 701/434; 235/375
(58) Field of Classification Search
USPC .................... 701/201, 434, 516; 235/375; 707/E17.044, 792
See application file for complete search history.

(56) References Cited

U.S. PATENT DOCUMENTS

| | | | |
|---|---|---|---|
| 5,648,768 A * | 7/1997 | Bouve | 340/988 |
| 5,702,166 A * | 12/1997 | Lee | 312/107 |
| 5,864,125 A | 1/1999 | Szabo | |
| 5,959,575 A | 9/1999 | Abbott | |
| 6,091,956 A * | 7/2000 | Hollenberg | 455/456.5 |
| 6,470,268 B1 | 10/2002 | Ashcraft et al. | |
| 6,587,835 B1 | 7/2003 | Treyz et al. | |
| 6,618,683 B1 | 9/2003 | Berstis et al. | |
| 7,043,548 B2 | 5/2006 | Bouet | |
| 7,120,928 B2 * | 10/2006 | Sheth et al. | 726/4 |
| 7,269,801 B2 | 9/2007 | Kyle | |
| 7,295,922 B2 | 11/2007 | Simon Robert et al. | |
| 7,474,896 B2 * | 1/2009 | Mohi et al. | 455/456.1 |
| 2003/0080901 A1 | 5/2003 | Piotrowski | |
| 2003/0212996 A1 * | 11/2003 | Wolzien | 725/60 |
| 2004/0054597 A1 | 3/2004 | Gulliver et al. | |
| 2005/0021369 A1 * | 1/2005 | Cohen et al. | 705/2 |
| 2005/0046584 A1 * | 3/2005 | Breed | 340/825.72 |
| 2005/0073407 A1 * | 4/2005 | Giraldin et al. | 340/539.2 |
| 2005/0236477 A1 * | 10/2005 | Chase | 235/383 |
| 2006/0004512 A1 * | 1/2006 | Herbst et al. | 701/208 |
| 2007/0001904 A1 * | 1/2007 | Mendelson | 342/450 |
| 2007/0206001 A1 | 9/2007 | McKay | |
| 2008/0009344 A1 * | 1/2008 | Graham et al. | 463/25 |
| 2010/0121567 A1 * | 5/2010 | Mendelson | 701/206 |

* cited by examiner

*Primary Examiner* — Behrang Badii
*Assistant Examiner* — Daniel L Greene
(74) *Attorney, Agent, or Firm* — Cantor Colburn LLP; William A. Kinnaman, Jr.

(57) ABSTRACT

A system for providing navigation information to a user in a region, the system including: a plurality of navigation stations disposed throughout the region and coupled to a communications network, each station having a wireless interface configured to communicate interactively with a mobile device carried by the user; wherein the system is configured to receive a destination at a selected navigation station using the wireless interface, to provide directions from the selected navigation station to the destination using the mobile device, and to track movement of the user throughout the region using interaction between the mobile device and a navigation station in range of the mobile device or interaction between the user and one of the navigation stations selected by the user.

30 Claims, 10 Drawing Sheets

KIOSK USAGE

OVERALL ARCHITECTURE WITH NETWORK OF SCANNERS

OVERALL ARCHITECTURE WITH NETWORK OF BEACONS

FLOW OF PHYSICAL KIOSK USE

FLOW OF MOBILE APPLET USE USING NETWORK OF SCANNERS

FLOW OF MOBILE APPLET USE USING NETWORK OF BEACONS

SAMPLE IMPLEMENTATION USING NETWORK OF SCANNERS

SAMPLE IMPLEMENTATION USING NETWORK OF BEACONS

METHOD FOR PROVIDING INTERACTIVE SITE MAP

BACKGROUND

The present invention relates to providing navigation information to a user. More particularly, the information is provided using a network of kiosks, scanners, and beacons that interactively communicate with a wireless device carried by the user.

People often find themselves in unfamiliar surroundings trying to navigate their way to a destination. For example, you have a meeting in an unfamiliar building or perhaps you are trying to find a particular store in a large mall or outlet center that you are unfamiliar with. You might find a static "you are here" layout map but this type of map has very limited use. These static maps usually consist of using a list to look up the name of the place for which you are looking. The name is often associated with a number that has to be found on the static map. For stores listed in a named directory by category, it is often challenging to determine which category a particular store might belong to. Another alternative is a touch screen map; however, this type of map does not to help you find a destination on the map or match a name in a directory to its location on the map.

An additional problem is that half way to a destination it is easy to forget or pass the destination being sought. It can also be challenging to find where necessary stairs or elevators are relative to the destination you are looking for from the map representation. Even if you utilize websites, you will at best find a floor plan of a location, with the same static restrictions but no more specific details on how to get from location A to destination B.

A global positioning system (GPS) can be used to provide navigation directions where a GPS signal is available. Unfortunately, the GPS signal might not be available in a building and, when it is available, the GPS signal is only accurate to within a few hundred feet. In addition, the GPS might not have detailed geographic information for a building or a complex of buildings.

Therefore, what are needed are techniques to provide navigation instructions to a user and, in particular, to a user in a building or complex of buildings.

SUMMARY

The shortcomings of the prior art are overcome and additional advantages are provided through the provision of a system for providing navigation information to a user in a region, the system including: a plurality of navigation stations disposed throughout the region and coupled to a communications network, each navigation station having a wireless interface configured to communicate interactively with a mobile device carried by the user; wherein the system is configured to receive a destination at a selected navigation station using the wireless interface, to provide directions from the selected navigation station to the destination using the mobile device, and to track movement of the user throughout the region using interaction between the mobile device and a navigation station in range of the mobile device or interaction between the user and one of the navigation stations selected by the user.

Also disclosed is a method for providing navigation information to a user in a region, the method including: receiving a destination from the user with a navigation station in a navigation system having a plurality of navigation stations disposed throughout the region and coupled to a communications network, each navigation station having a wireless interface configured to communicate interactively with a mobile device carried by the user; providing directions from the navigation station to the destination using the mobile device; and tracking movement of the user throughout the region using interaction between the mobile device and a navigation station in range of the mobile device or interaction between the user and one of the navigation stations selected by the user.

Further disclosed is a computer-readable medium having computer-executable instructions for providing navigation information to a user in a region by implementing a method including: receiving a destination from the user with a navigation station in a navigation system having a plurality of navigation stations disposed throughout the region and coupled to a communications network, each station having a wireless interface configured to communicate interactively with a mobile device carried by the user; providing directions from the navigation station to the destination using the mobile device; and tracking movement of the user throughout the region using interaction between the mobile device and a navigation station in range of the mobile device or interaction between the user and one of the navigation stations selected by the user.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings, wherein like elements are numbered alike, in which:

Figure 1:
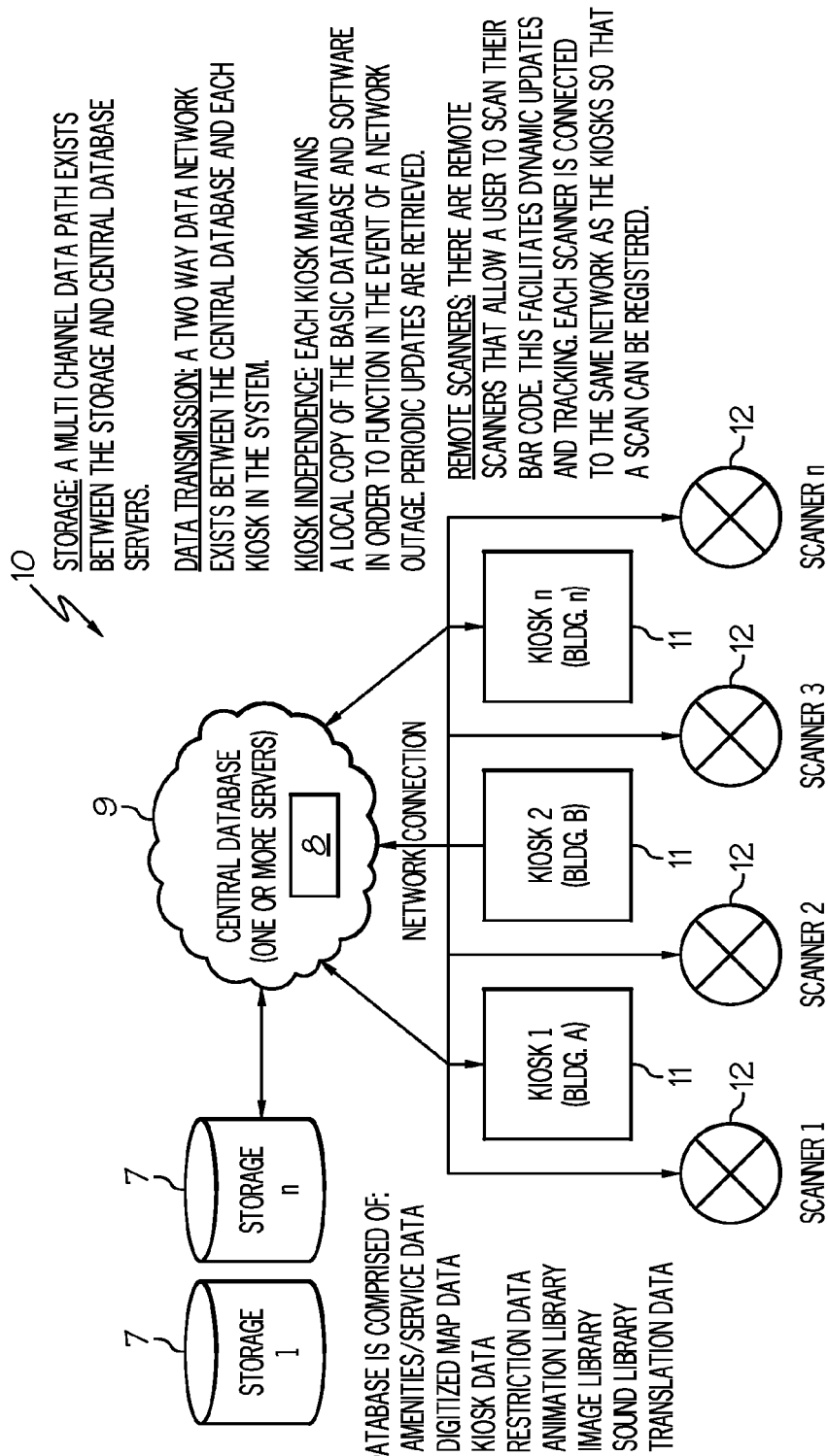
FIG. 1 illustrates an exemplary embodiment of a navigation system having a network of kiosks and a network of scanners.

The detailed description explains the preferred embodiments of the invention, together with advantages and features, by way of example with reference to the drawings.

DETAILED DESCRIPTION

Disclosed are exemplary embodiments of techniques for providing navigation instructions to a user. The techniques, which include apparatus and method, call for a navigation system that includes an interactive network of kiosks, scanners, or radio beacons disposed throughout a region the user is expected to traverse on the user's way to a destination. The system is configured to communicate interactively with the user as the user proceeds towards the destination. The region can be in a large building such as a shopping mall or a complex of buildings such as an airport or university campus.

Each kiosk is configured to interact with the user either directly at the kiosk using a keyboard (physical or virtual) or voice recognition or remotely from the kiosk using a wireless device such as a personal digital assistant, cell phone, or computer. When the user interacts with the kiosk using the wireless device, directions (i.e., route) and any other information can be downloaded directly from the kiosk to the wireless device. In one embodiment, the user inputs a destination into one kiosk and the kiosk provides directions and a scan-readable device, such as a bar code configured to be read by a scanner. The scanner can be standalone or integrated into the kiosks. As the user traverses the region using the directions to the destination, the scan-readable device can be read along the route. Scanners reading the scan device will provide current location information to the navigation system. Hence, the navigation system can detect if the user deviates from the directions and provide a new route via the wireless device to the destination based on the user's current location. When the user reaches the destination, a scanner at the destination will read the scan device and provide this information to the navigation system. The navigation system will determine that the user has reached their destination and remove the routing of the user from memory, thus, ending interaction with that user for that particular routing.

In another embodiment, in addition to or in place of the scanners, radio beacons can be used to communicate with the wireless device as the user traverses the route. By using the radio beacons, the user does not have to scan the scan-readable device. The navigation system using the radio beacons can automatically interact with the wireless device as the user gets within range of a beacon or beacons. Thus, the navigation system can track the progress of the user as the user follows the directions. In one embodiment, the navigation system can determine a magnitude of a signal received from the wireless device and use the magnitude to estimate a location of the user. If the signal is received by more than one kiosk or beacon, then the location can be estimated by "triangulation."

Each scanner or radio beacon may be considered a "simple" kiosk in that the scanner or beacon can provide the same wireless interaction that a kiosk can provide. For example, the scanner can include a bar code scanner and a wireless interface. In addition, the scanner includes a local processing system to download data from a central database and compute directions. The local processing system also included in each kiosk allows for continued operation of the navigation system in the event communication with the central database is lost. Input is received from the wireless device and directions are provided to the wireless device using the wireless interface. The radio beacon in one embodiment includes only the wireless interface and the local processing system.

Reference may now be had to FIG. 1. FIG. 1 illustrates an exemplary embodiment of a navigation system 10. The navigation system 10 includes a network of kiosks 11 and scanners 12. The scanners 12 are configured to read a scan-readable device such as a bar code or a radio frequency identification device (RFID) as non-limiting examples. The network of kiosks 11 and scanners 12 is coupled to a central database 9 having one or more servers 8. The central database 9 in turn is coupled to storage units 7 for storing data in the central database 9. A multi-channel data path is used between the central database 9 and the storage units 7. The central database 9 includes amenities/service data, digitized map data (floor plan or blue print), kiosk data, restriction data, animation library, image library, sound library, and translation data as non-limiting examples. A two-way data network is used between the central database 9 and each kiosk 11 in the system 10. Each kiosk 11 maintains a local copy of the basic database and software maintained by the central database 9 in order to function in the event of a network outage. Updates of the basic database and interactive software are retrieved from the central database 9 by each kiosk 11 periodically.

The interactive software and database allow a user to input a destination into a selected kiosk 11 and to calculate a route from that kiosk 11 to the destination. The route considers user preferences and restricted and secure areas not accessible to the user. For example, the user might be physically challenged and requires use of wheelchair accessible routes. The interactive software and database allow the user to include other waypoints along the route to the destination and to modify the destination or include other waypoints using another kiosk 11 available along the route. When the destination is modified or other waypoints added, the interactive software and database will calculate a new route. Similarly, a new route will be calculated when the user gets lost or deviates from the original calculated route.

The remote scanners 12 allow a user to scan their unique scan-readable device as the user proceeds to their destination. This facilitates tracking of the user and dynamic updates of directions. Each scanner 12 is connected to the same network as the kiosks 11 so that a scan can be registered with the system 10.

Figure 2:
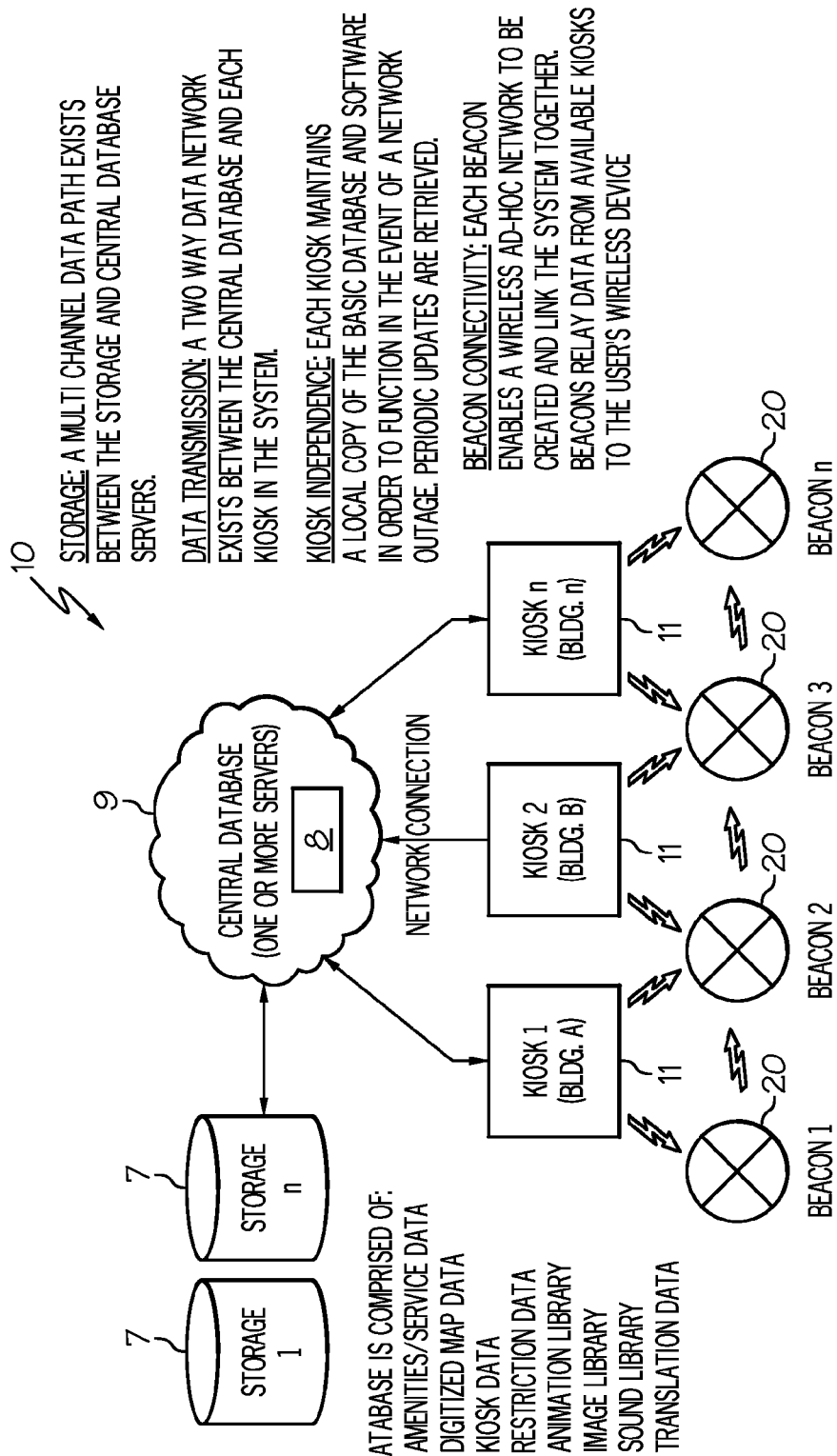
FIG. 2 illustrates an exemplary embodiment of the navigation system having the network of kiosks and a network of radio beacons.

Reference may now be had to FIG. 2. FIG. 2 illustrates another exemplary embodiment of the navigation system 10. The navigation system 10 in FIG. 2 is similar to the embodiment of FIG. 1 except that the network of scanners 12 is replaced by a network of radio beacons 20.

Figure 3:
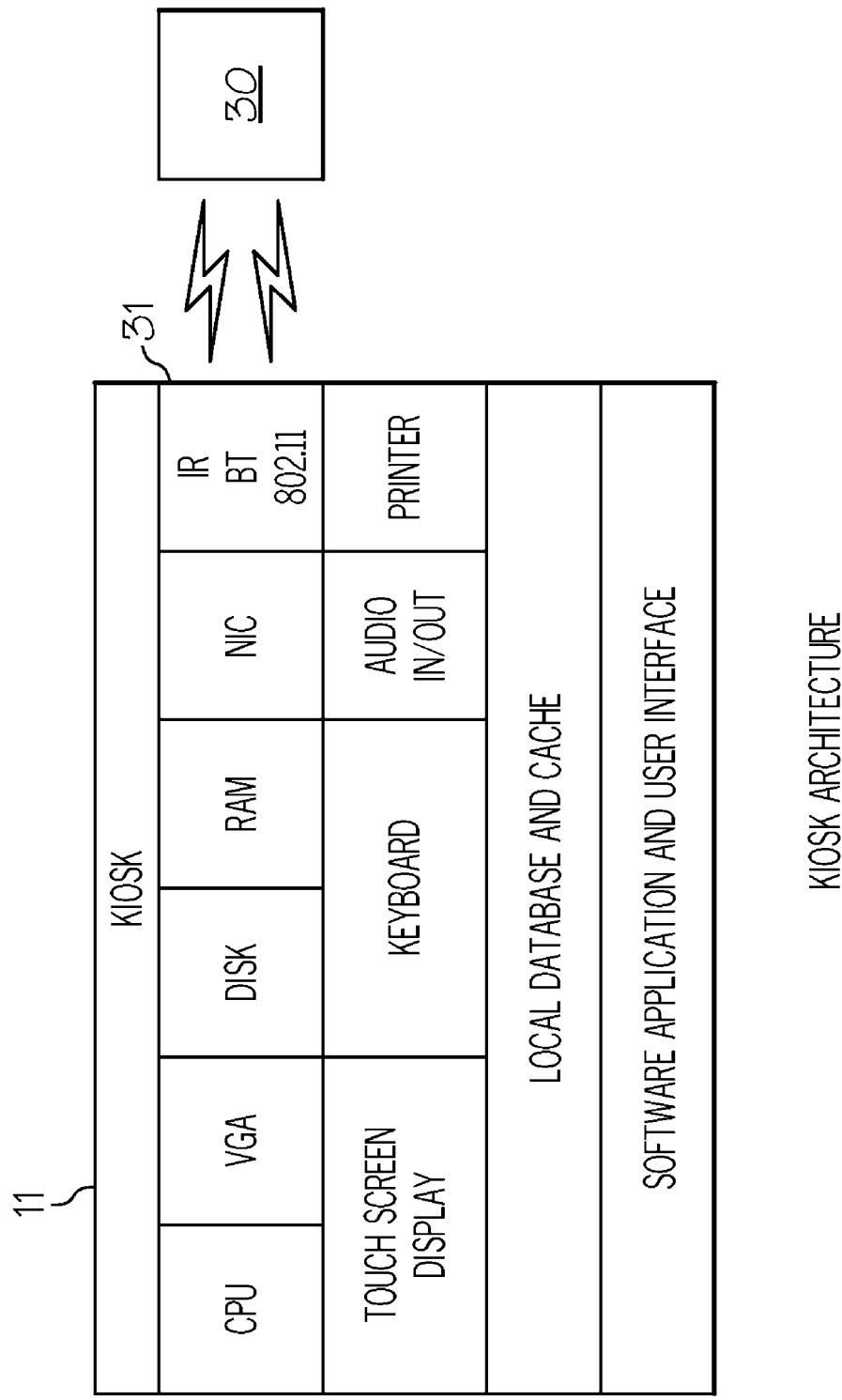
FIG. 3 depicts aspects of one kiosk in the network of kiosks.

Reference may now be had to FIG. 3. FIG. 3 depicts aspects of one kiosk 11 in block format. Some of the components included in the kiosk 11 include a processor, video interface, hard disk, memory, network interface card (NIC), local wireless network interface 31, touch screen display, keyboard, audio input and output, local database and cache, and software application including a user interface. The local wireless interface allows the kiosk 11 to upload (i.e., wirelessly transfer) a mobile version (applet) of the interactive software to a user with a local network wireless device (referred to herein as a mobile device) 30 as the user comes within range of the kiosk 11. The ability to download the applet to the user's mobile device 30 eliminates the need to wait for a kiosk to become available. As part of the download process, the applet will detect the preferred language of the mobile device and interactions with the user will be translated into the appropriate language.

In general, wireless communication is accomplished using standard short range radio frequencies such as those used with Bluetooth, cellular (such as related to general packet radio service (GPRS), third generation mobile communications (3G), broadband wireless access (WiMax) related to IEEE 802.16, IrDA protocols for using infrared light for communications, and Wireless Local Area Network (WLAN) (such as related to IEEE 802.11a,b,g,n) as non-limiting examples. To provide security and privacy, the wireless communication can be encrypted and secured using security protocols.

Each kiosk 11 includes access to the central database 9, a local database (i.e., at each kiosk 11), and a software application, which has been preprogrammed to understand the blue print or layout of the complex and locations (e.g., coordinates) of all amenities (e.g., restrooms), services and destinations therein. The database can also include the location of each kiosk 11. Because the location of each kiosk 11 is known within the layout of the complex, a distance algorithm can be utilized to find the shortest route to a selected destination. If a user specifies an amenity or service (such as a color copier for example), the system 10 will calculate the shortest overall route between the user, the color copier, and the final destination. The system 10 will present this route to the user and provide the ability to print or transmit directions to a wireless mobile device. A printed bar code will be provided if needed or requested.

Wireless connections are used to dynamically update directions and content while the user traverses a building or complex and scans the scan-readable device at a nearby kiosk 11 or at a nearby scanner 12. In lieu of scanning the scan-readable device, the navigation system 10 can estimate a location of the user by wireless two-way communications established with the mobile device 30 by at least one kiosk 11, at least one scanner 12, or at least one radio beacon 20. In one embodiment, the mobile device 30 displays a map with an indicator that tracks the estimated location of the user.

Figure 4:
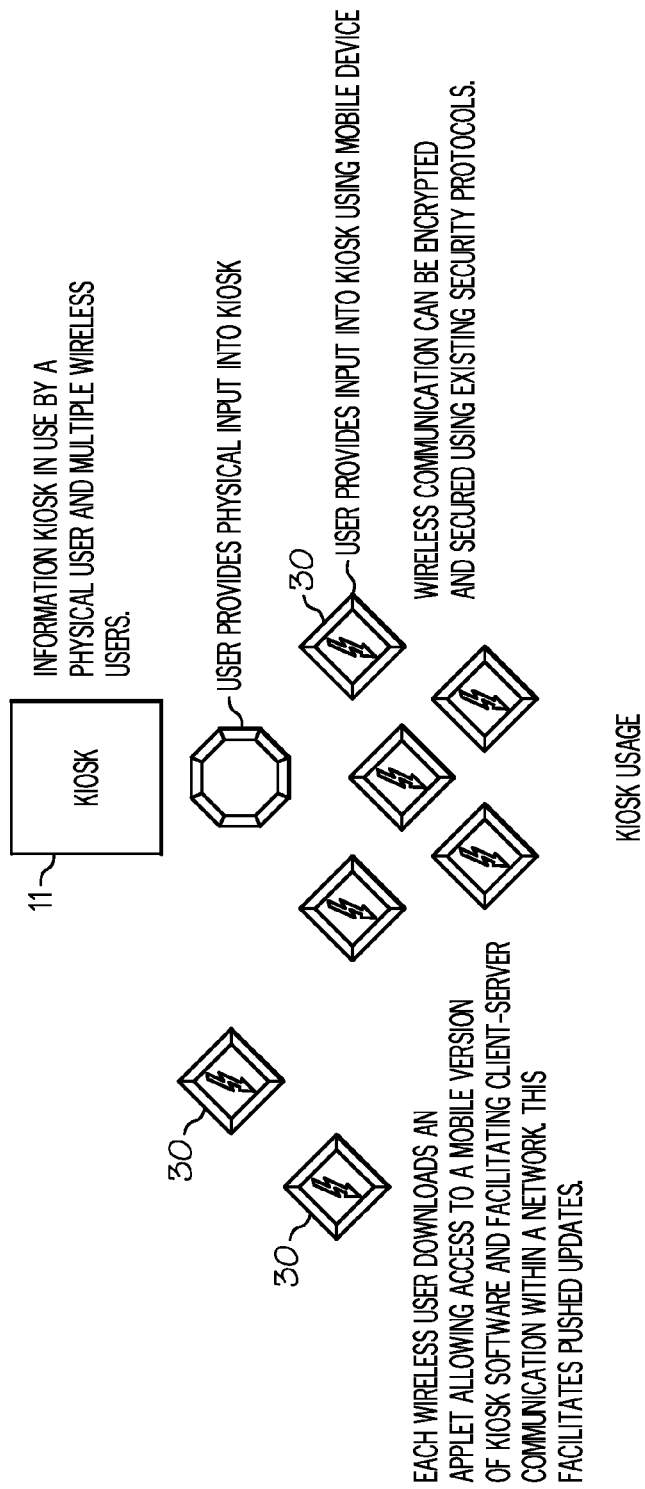
FIG. 4 depicts aspects of a physical user and a plurality of users interacting with one kiosk.
Figure 5:
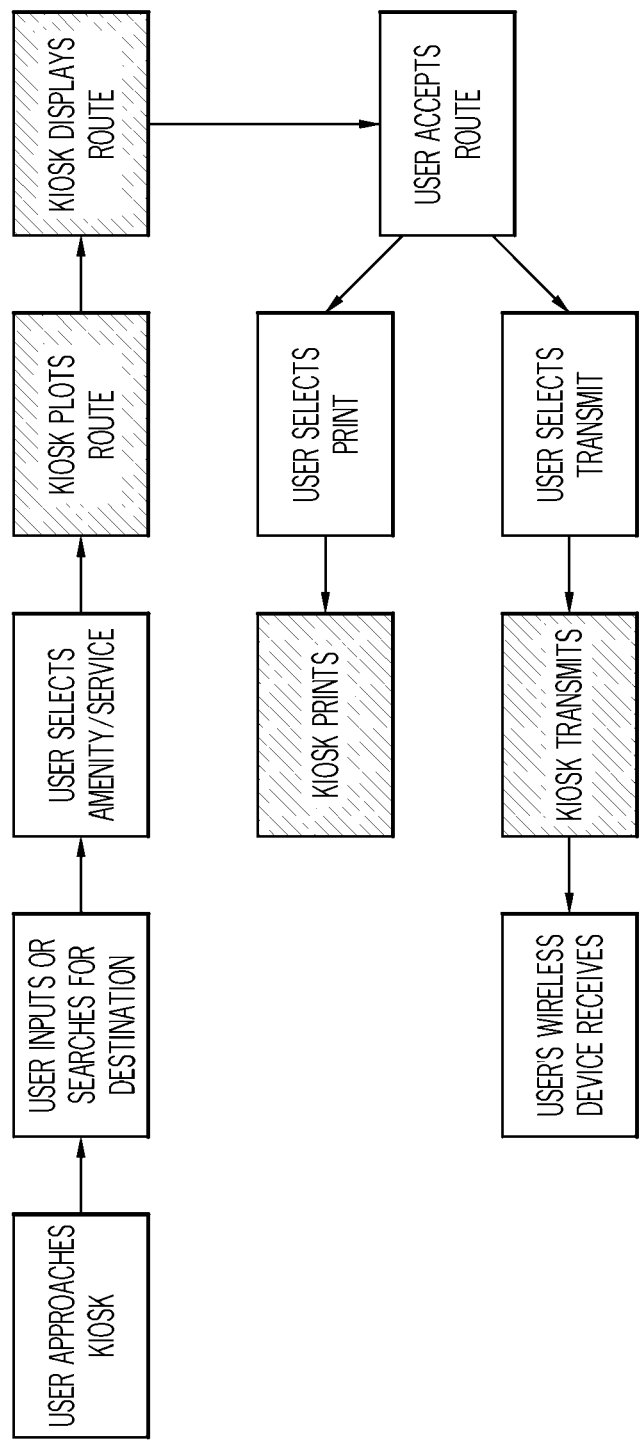
FIG. 5 presents a flow chart depicting aspects of physically using one kiosk.

Reference may now be had to FIG. 4. FIG. 4 depicts aspects of a physical user and a plurality of wireless users interacting with one kiosk 11. In FIG. 4, one user is physically using the kiosk 11. Because the kiosk 11 is physically occupied, one or more wireless users can connect to the kiosk 11 without waiting for the kiosk 11 to become free. The physical user and the wireless users can interact with the kiosk 11 simultaneously. The physical user can interact using a physical keyboard, a virtual keyboard (e.g., touch screen), touch screen selection, a navigation keypad for highlighting a map, a scanner, or a voice recognition interface as non-limiting examples of physical interfaces. In general, the kiosk 11 displays a map with which the user can interact. Interaction includes selecting a destination, changing a destination, selecting a waypoint, changing a waypoint, changing a computed route, receiving information about popular facilities (i.e., amenities), zooming in and out of the map, and scanning a bar code to update present location. FIG. 5 presents a flow chart depicting aspects of physically using the kiosk 11.

Figure 6:
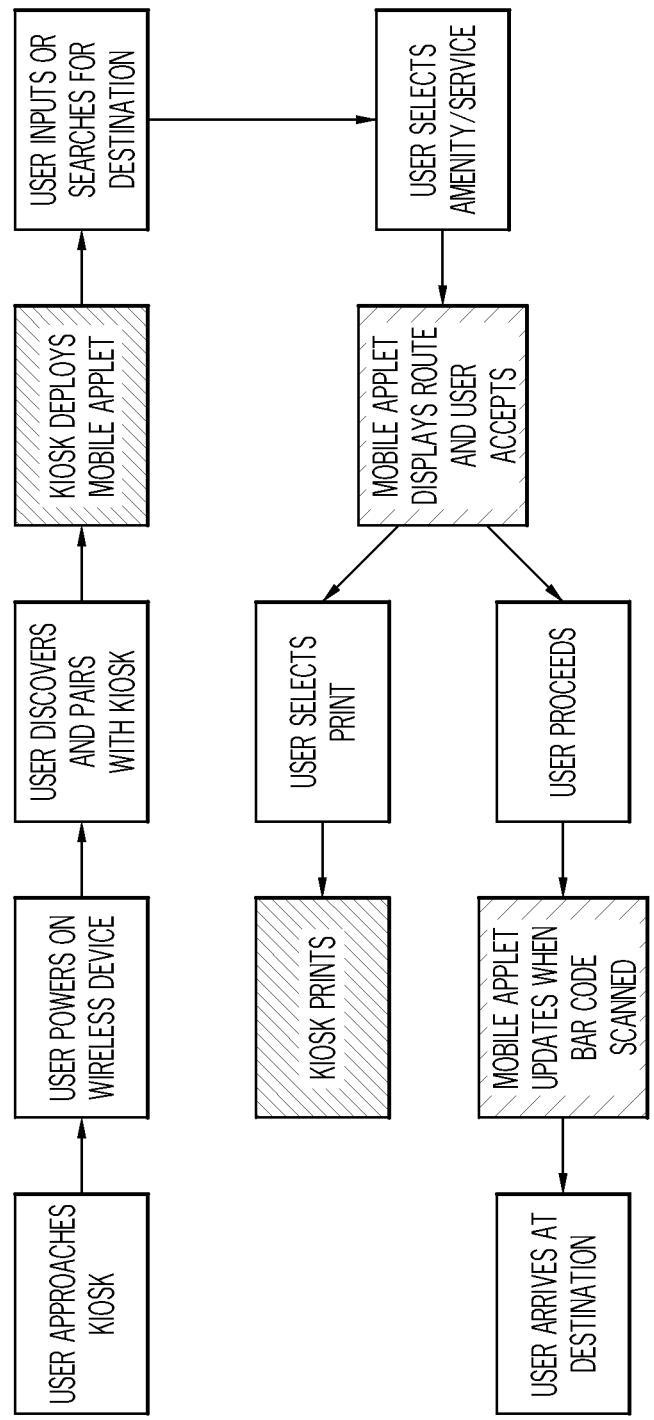
FIG. 6 presents a flow chart depicting aspects of using a mobile software applet with the network of scanners.
Figure 7:
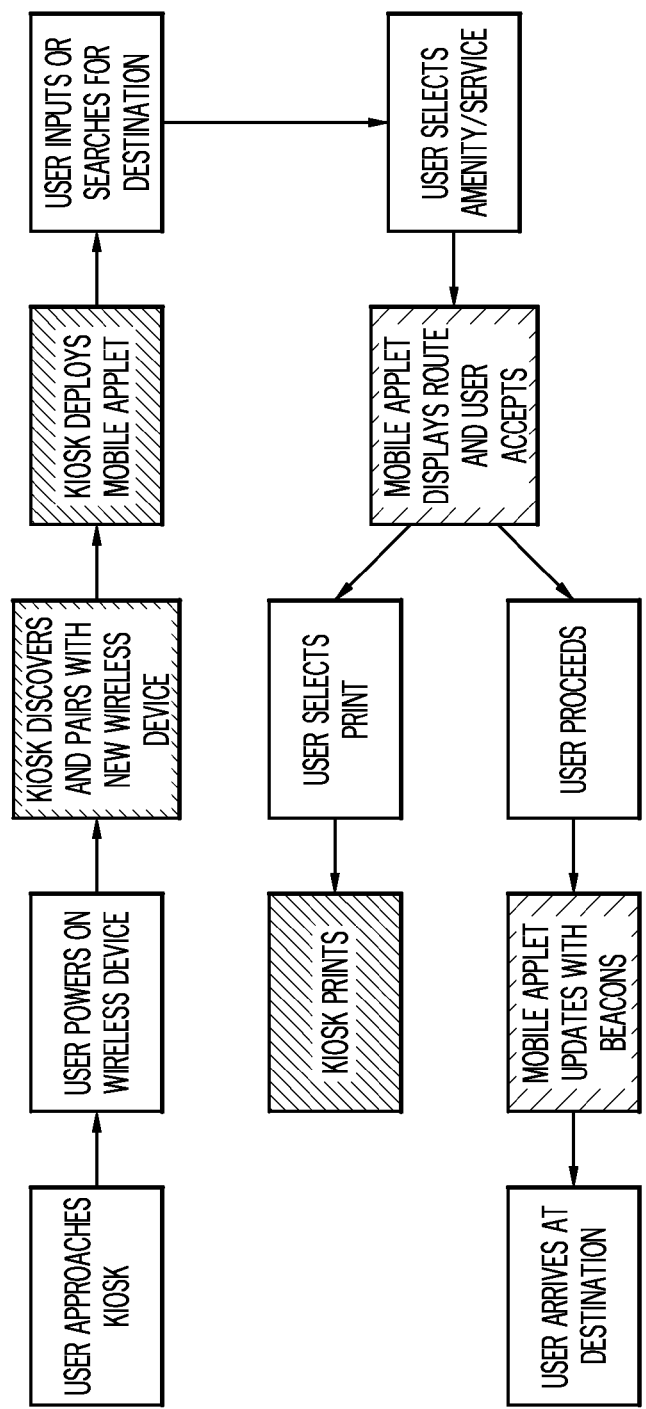
FIG. 7 presents a flow chart depicting aspects of using the mobile applet with the network of radio beacons.

For wireless interaction, each kiosk 11 is configured to upload the mobile software applet to each mobile device 30 within communication range to establish a wireless connection to the kiosk 11. As an example of operation of the navigation system 10, a user with the mobile device 30 will approach one kiosk 11 and when within range will establish a wireless connection with that kiosk 11 and download the interactive mobile software applet. The applet provides each wireless user with the same or similar interaction capability as the physical user as described above. In addition, the applet facilitates client-server communication within the network of the system 10, which can provide updates to directions and information to each mobile device 30. The same route-calculating algorithm as used by the kiosk 11 will be used by the applet to find the shortest route to a selected destination. If a user specifies an amenity or service (such as a vending machine), the applet will calculate the shortest overall route between the user, the vending machine, and the final destination. The applet will present this route to the user and provide the ability to print the directions or to use interactive directions on the wireless device. A printed bar code will be provided if needed or requested. As the user proceeds to follow the directions, the user can scan the barcode at the scanner 12 or the kiosk 11 local to the user. The applet in the mobile device 30 will receive updates to the directions or other information based on the current location. Using the applet, the user can change and recalculate the route while following the original directions. FIG. 6 presents a flow chart depicting aspects of using the mobile software applet using the network of kiosks 11 and scanners 12. FIG. 7 presents a flow chart depicting aspects of using the mobile software applet using the network of kiosks 11 and radio beacons 20.

Figure 8:
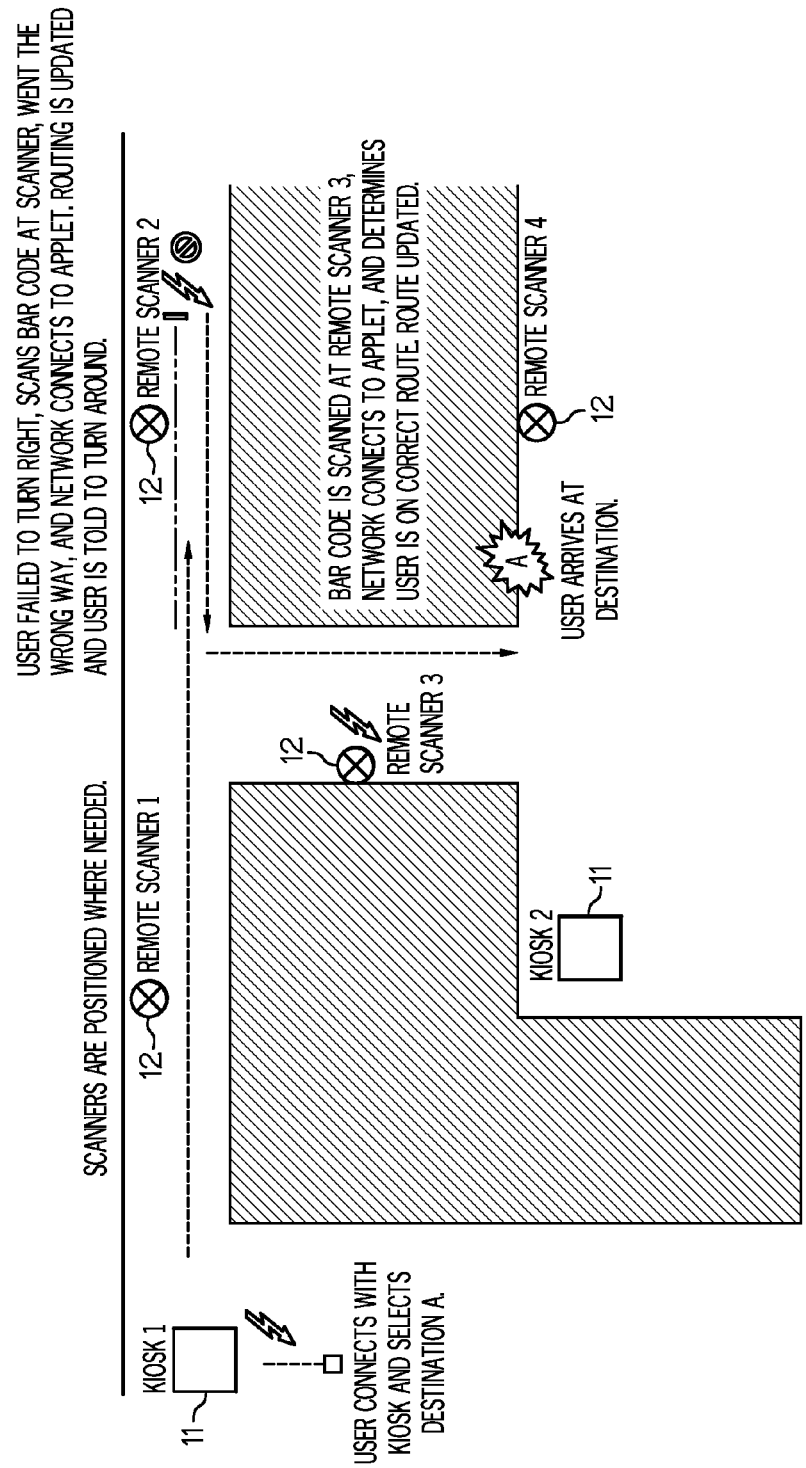
FIG. 8 presents a sample implementation of the navigation system using the network of kiosks and the network of scanners.

A sample implementation of the navigation system 10 using the network of scanners 12 is presented with reference to FIG. 8. The user wirelessly connects with kiosk #1 and inputs destination A. The user receives a barcode and directions instructing the user to proceed down the Main Hallway and turn right at the first intersection. The user fails to turn right and keeps walking down the main hallway towards scanner #2. At scanner #2, the user scans the barcode and is informed by way of the mobile device 30 carried by the user that the user is following an incorrect route. Accordingly, the system 10 provides updated directions via the mobile device 30 to destination A based on the users present location at scanner #2. The user then follows the new route, turns left at the intersection, and scans the barcode at scanner #3. The system 10 informs the user that they are on the correct route and updates the location of the user. In addition, the system 10 can update the route if required. When the user arrives at destination A, the user can scan the bar code at scanner #4 to inform the system 10 that the user has arrived at the destination. Upon notification that the user has arrived at the destination, the system 10 ceases to track the progress of the user. If the user fails to scan the bar code at the final destination, the navigation system 10 can be configured to terminate tracking the user if no scans of the bar code are received within a predetermined time interval.

Figure 9:
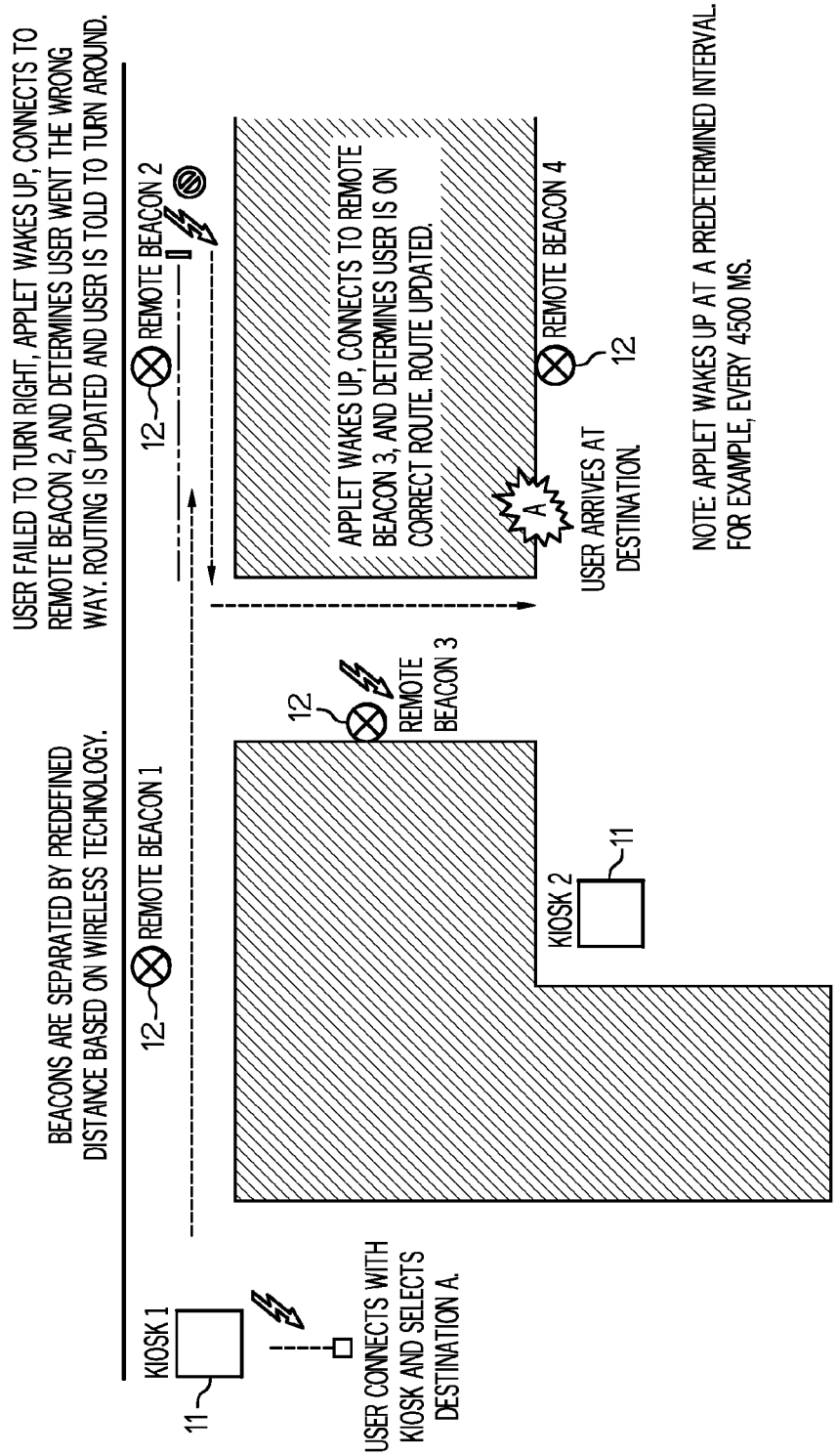
FIG. 9 presents a sample implementation of the navigation system using the network of kiosks and the network of radio beacons.

A sample implementation of the navigation system 10 using the network of radio beacons 20 is presented with reference to FIG. 9. In this sample implementation, the applet establishes communication with the system 10 at a predetermined interval such as every 4500 milliseconds. As in the previous sample implementation, the user fails to follow the directions/route. However, now the applet connects to remote beacon #2, determines that the user is not following the route, and provides a new route to destination A based upon the user's current location. As the user follows the new route, the applet connects with remote beacon #3 and determines that the user is following the correct route. When the user reaches destination A, the applet connects with remote beacon #4, determines that the user has reached the final destination, and ceases to track the progress of the user.

The following is a sample implementation of the navigation system 10 for a user physically providing input into the system 10 at an airport.

1. Passenger arrives at airport and approaches a kiosk 11
2. Passenger scans boarding pass bar code at kiosk 11
3. Kiosk determines gate and terminal
4. Kiosk interacts with passenger to determine if there are additional stops (way points)
5. Kiosk plots route based on passenger input
6. Passenger selects to print route or transfer the route to wireless device 7. Passenger follows route
    a. Passenger desires to create new waypoint:
        i. Passenger scans boarding pass bar code at kiosk 11
        ii. Kiosk 11 identifies passenger and existing route based on previous scan
        iii. Kiosk 11 interacts with passenger to determine what the passenger would like to do
        iv. Kiosk 11 plots new route based on passenger input
        v. Passenger selects to print route or transfer the new route to wireless device
        [Repeat step 7 and continue]
8. Passenger arrives at destination and scans boarding pass bar code at a remote scanner or kiosk
    (for example, this could take place when the boarding pass is scanned by the attendant)
9. System removes passenger routing from memory The following is a sample implementation of the navigation system 10 for a user wirelessly using the system 10 at an airport.

Figure 10:
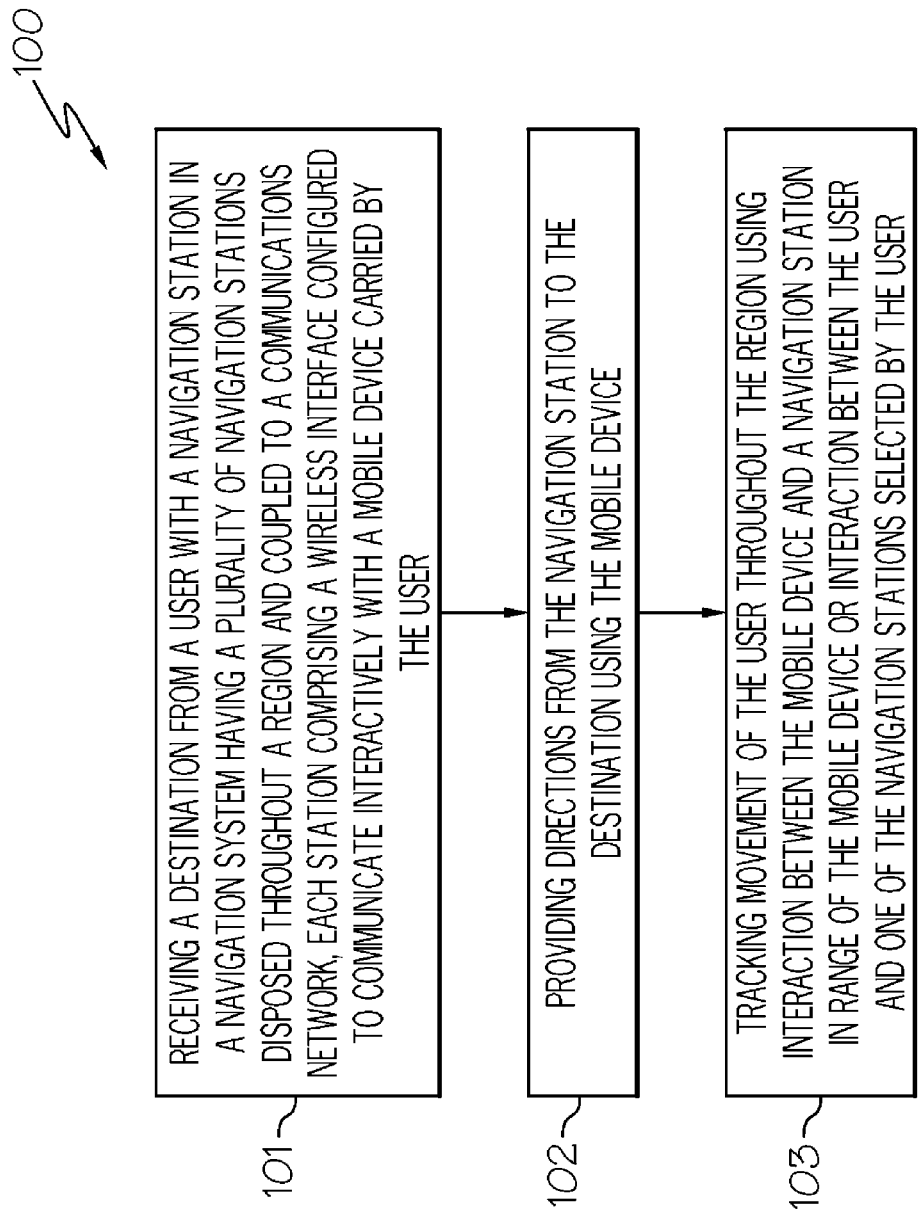
FIG. 10 presents one example of a method for providing navigation information to a user in a region.

1. Passenger arrives at airport and approaches a kiosk 11
2. Passenger uses personal wireless device to connect to kiosk 11
    (for example, using Bluetooth or simply connecting to the kiosk as if it were a Wi-Fi access point)
3. Passenger's wireless device and kiosk 11 communicate and software applet is downloaded to passenger's wireless device
4. Passenger interacts with software applet and "scans" boarding pass bar code using built-in camera (e.g., some phones have the ability to pictorially scan bar codes)
5. Software applet determines gate and terminal
6. Software applet interacts with passenger to determine if there are additional stops (i.e., way points)
7. Software applet plots route based on passenger input
8. (Optional) Passenger selects to print route (at kiosk 11)
9. Passenger follows interactive route
    a. Passenger desires to create new waypoint:
        i. Passenger interacts with software applet to search for and select a waypoint or new destination
            (scanning the bar code is not required as this is stored in memory)
            (passenger could do this from a local kiosk 11 as well, requiring the bar code to be scanned and thus following the physical use)
        ii. Software applet plots new route based on passenger input
        iii. (Optional) Passenger selects to print route (at kiosk 11)
        [Repeat step 9 and continue]
10. (Optional) Passenger scans bar code at remote scanner and wireless device is updated through Wi-Fi communication with network
    (system is aware of passenger's wireless device media access control (MAC) address and bar code, knowing the MAC address identifies what internet protocol (IP) address was associated and establishes a connection to the wireless device, software applet talks to network and routing is updated)
11. Passenger arrives at destination and scans bar code at a remote scanner 12, kiosk 11, or indicates destination has been reached using the software applet
    (for example, this can take place when the boarding pass is scanned by the attendant)
12. System removes passenger routing from memory Reference may now be had to FIG. 10. FIG. 10 presents one example of a method 100 for providing navigation information to a user in a region. The method 100 calls for (step 101) receiving a destination from a user with at least one navigation station (i.e., the kiosk 11, the scanner 12 or the radio beacon 20). Further, the method 100 calls for (step 102) providing directions from the navigation station to the destination using the mobile device 30. Further, the method 100 calls for (step 103) tracking movement of the user throughout the region using interaction between the mobile device 30 and a navigation station in range of the mobile device or interaction between the user and one of the navigation stations selected by the user.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The term "navigation station" relates to at least one of a kiosk, a scanner, and a radio beacon as discussed above.

The flow diagrams and examples depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A system for providing navigation information to a user in a region, the system comprising:
    a plurality of kiosk navigation stations disposed throughout the region and coupled to a communications network, each kiosk navigation station comprising a wireless interface configured to communicate interactively with a mobile device carried by the user and a physical input device configured to receive an interaction with the user;
    wherein the system is configured to receive a destination at a selected kiosk navigation station using the wireless interface, to provide directions from the selected kiosk navigation station to the destination using the mobile device, and to track movement of the user throughout the region using interaction between the mobile device and a kiosk navigation station in range of the mobile device or interaction between the user and one of the kiosk navigation stations selected by the user using the physical input device.

2. The system of claim 1, wherein the mobile device is configured to interactively communicate with the system using short range electromagnetic frequencies.

3. The system of claim 2, wherein the system is further configured to provide secured interactive communication using encryption.

4. The system of claim 1, wherein the system is further configured to detect if the user is not following the directions, to notify the user upon detection using the mobile device, and to provide updated directions by way of the mobile device based upon the user's current location.

5. The system of claim 1, wherein the system is further configured to receive a waypoint from the user and the directions comprise a route that includes the waypoint.

6. The system of claim 1, wherein the system is further configured to provide metadata to the mobile device, the metadata comprising at least one of an advertisement, an interactive feature, weather, emergency information and updated information.

7. The system of claim 1, wherein the system is further configured to wirelessly upload a software application from a kiosk navigation station in the plurality of kiosk navigation stations to the mobile device, the software application providing interaction capability between the mobile device and the kiosk navigation station that uploaded the software application.

8. The system of claim 7, wherein the software application comprises digitized map data of the region.

9. The system of claim 7, wherein the software application comprises a route-calculation algorithm configured to calculate the directions on the mobile device.

10. The system of claim 7, wherein the software application further provides for communication with a server networked with the plurality of kiosk navigation stations.

11. The system of claim 7, wherein the region is an airport and the destination is an airport terminal and gate, and the uploaded software application is configured to determine the terminal and gate upon the user inputting flight information into the mobile device.

12. The system of claim 1, wherein each kiosk navigation station comprises a scanner configured to read a readable-device that identifies the user to detect if the user is following the directions.

13. The system of claim 12, wherein detection of the readable-device provides the interaction between the user and one of the kiosk navigation stations selected by the user.

14. The system of claim 12, wherein at least one of the kiosk navigation stations is configured to provide the readable-device.

15. The system of claim 1, wherein at least one kiosk navigation station comprises a display configured to interact with the user.

16. The system of claim 15, wherein the system is further configured to display an interactive map of the region.

17. The system of claim 15, wherein the at least one kiosk navigation station comprises at least one of a physical keyboard, a virtual keyboard, and voice recognition technology configured to receive input from the user and a printer configured to provide the directions to the user.

18. The system of claim 1, wherein the system is further configured to receive input identifying the user as having a wheelchair and to provide wheelchair accessible directions.

19. The system of claim 1, wherein the directions comprise an image or text of at least a portion of a route.

20. The system of claim 1, further comprising a central database coupled to the network, the central database comprising at least one of amenities data, service data, digitized map data, restriction data, physical challenge data, animation library, image library, sound library, and translation data.

21. The system of claim 20, wherein the system is further configured to download at least a portion of data stored in the central data base to at least one of the kiosk navigation stations to allow the at least one kiosk navigation station to calculate the directions.

22. The system of claim 1, wherein the system is further configured to estimate a location of the user using a magnitude of a signal received by at least one kiosk navigation station from the mobile device.

23. The system of claim 1, wherein the system is further configured to display the directions on the mobile device and to receive indication of acceptance of the directions by the user.

24. The system of claim 1, wherein the system is further configured to (a) receive arrival input from the user upon the user arriving at the destination and (b) remove the user directions from memory and cease tracking the user upon receiving the arrival input.

25. The system of claim 24, wherein each navigation kiosk comprises a printer and the system is configured to print the directions at the printer of the selected kiosk navigation station upon command from the mobile device.

26. A method for providing navigation information to a user in a region, the method comprising:
receiving a destination from the user with a kiosk navigation station in a navigation system comprising a plurality of kiosk navigation stations disposed throughout the region and coupled to a communications network, each kiosk navigation station comprising a wireless interface configured to communicate interactively with a mobile device carried by the user and a physical input device configured to receive an interaction with the user;
providing directions from the kiosk navigation station to the destination using the mobile device; and
tracking movement of the user throughout the region using interaction between the mobile device and a kiosk navigation station in range of the mobile device or interaction between the user and one of the kiosk navigation stations selected by the user using the physical input device.

27. The method of claim 26, further comprising receiving a waypoint from the user and providing directions comprising a route that includes the waypoint.

28. The method of claim 26, further comprising notifying the user by way of the mobile device if the user is not following the directions.

29. The method of claim 26, further comprising estimating a location of the user using a magnitude of signal received by at least one navigation station from the mobile device.

30. A non-transitory computer-readable medium comprising computer-executable instructions for providing navigation information to a user in a region by implementing a method comprising:
receiving a destination from the user with a kiosk navigation station in a navigation system comprising a plurality of kiosk navigation stations disposed throughout the region and coupled to a communications network, each kiosk navigation station comprising a wireless interface configured to communicate interactively with a mobile device carried by the user and a physical input device configured to receive an interaction with the user;
providing directions from the kiosk navigation station to the destination using the mobile device; and
tracking movement of the user throughout the region using interaction between the mobile device and a kiosk navigation station in range of the mobile device or interaction between the user and one of the kiosk navigation stations selected by the user using the physical input device.

* * * * *